(12) United States Patent
Hochgraf et al.

(10) Patent No.: US 6,794,844 B2
(45) Date of Patent: Sep. 21, 2004

(54) METHOD AND SYSTEM FOR FUEL CELL CONTROL

(75) Inventors: Clark Hochgraf, Livonia, MI (US); Prabhakar Singh, Richland, WA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 433 days.

(21) Appl. No.: 09/945,047

(22) Filed: Aug. 31, 2001

(65) Prior Publication Data

US 2003/0044658 A1 Mar. 6, 2003

(51) Int. Cl.[7] .................. H01M 10/44; H01M 10/46
(52) U.S. Cl. .................................................. 320/101
(58) Field of Search ................... 320/101, 103, 320/132, 167; 429/12, 13

(56) References Cited

U.S. PATENT DOCUMENTS

| | | | |
|---|---|---|---|
| 3,987,352 A | | 10/1976 | Hirota |
| 4,961,151 A | * | 10/1990 | Early et al. .................. 700/297 |
| 5,916,699 A | * | 6/1999 | Thomas et al. ................ 429/3 |
| 6,087,812 A | * | 7/2000 | Thomas et al. ............. 320/141 |
| 6,628,011 B2 | * | 9/2003 | Droppo et al. ................ 307/43 |

FOREIGN PATENT DOCUMENTS

| | | |
|---|---|---|
| EP | 0136187 A2 | 4/1985 |
| EP | 1160120 A2 | 12/2001 |
| JP | 2002-34171 | 1/2002 |
| WO | WO 02/25761 A1 | 3/2002 |

* cited by examiner

Primary Examiner—Edward H. Tso
(74) Attorney, Agent, or Firm—John E. Kajander

(57) ABSTRACT

A control system (20) for controlling the state of charge in an energy storage device (28) by manipulating the voltage of a fuel cell (24) through dynamic system modeling of predetermined parameters (21) for the fuel cell (24) as well as the energy storage device (28). According to the method (100) of the present invention, manipulation (108) of predetermined parameters related to the fuel cell and the energy storage device control the energy storage device to a desired state of charge or divides the load current between the two devices.

14 Claims, 2 Drawing Sheets

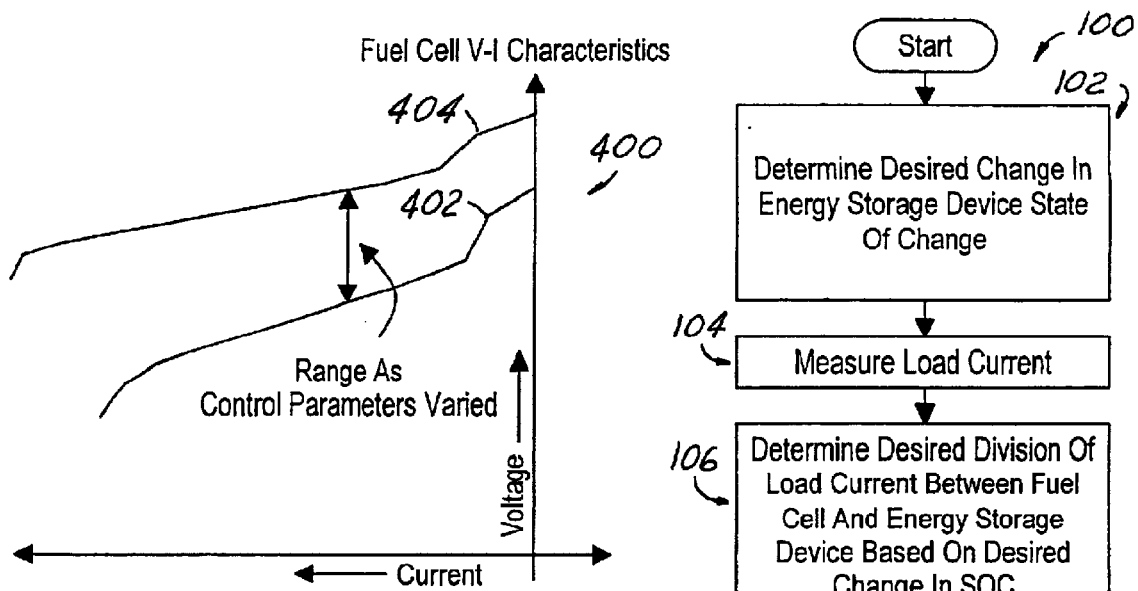
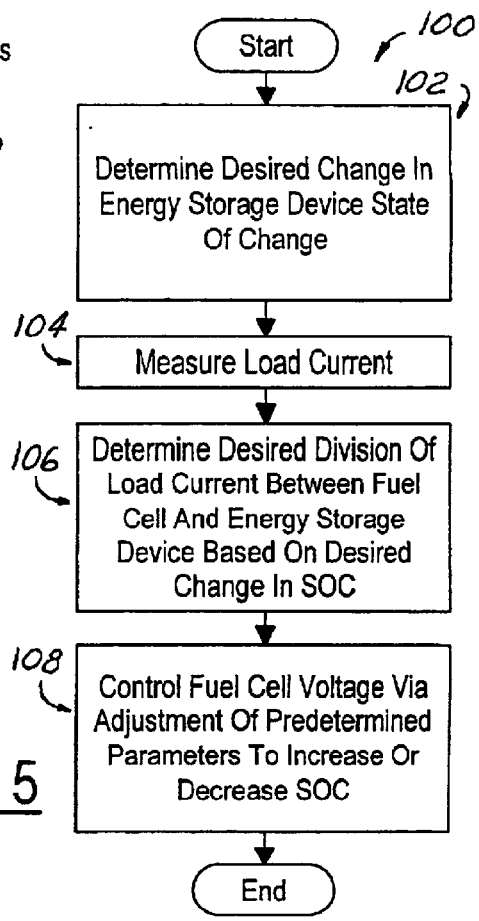
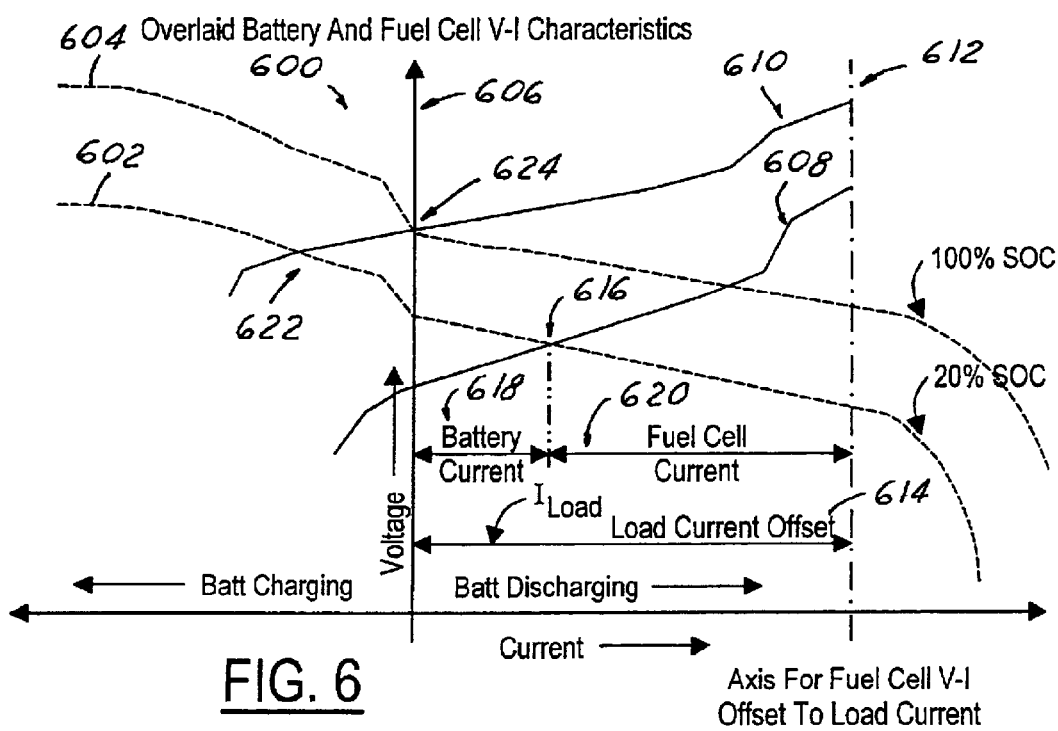

United States Patent US 6,794,844 B2

METHOD AND SYSTEM FOR FUEL CELL CONTROL

TECHNICAL FIELD

The present invention relates generally to a fuel cell system for power generation and more particularly to a method for controlling fuel cell outputs to be compatible with an energy storage device.

BACKGROUND OF THE INVENTION

Fuel cell systems offer many advantages over conventional sources. In a fuel cell, electricity is generated electromechanically through the reaction of hydrogen with oxygen. The only reaction emission involved is water vapor, which is essentially harmless to the environment. This is in contrast to a conventional power generation system, which releases harmful emissions such as hydrocarbons, carbon monoxide and other chemicals.

Fuel cell systems that are used for power generation must be controlled to meet electrical demand under normal, as well as transient, operating conditions. Long term fluctuations in the external load must be taken care of within the fuel cell system through the system controls that lead to fuel and oxidant energy input and output.

The fuel cell power generation systems are typically complex in that they require a power conversion stage for interfacing the fuel cell and energy storage. The power conversion stage modifies the output voltage of the fuel cell to be compatible with the load or with additional power conversion stages such as an inverter. Efficiency losses are incurred and additional cost added for each power conversion stage. Therefore, these power generation systems tend to be very costly.

SUMMARY OF THE INVENTION

It is an object of the present invention to provide a process for controlling a fuel cell system. It is another object of the present invention to reduce the overall cost of a fuel cell power generation system by eliminating the need for multiple power conversion stages. It is a further object of the present invention to manipulate fuel cell system variables in response to the total power load on the fuel cell in combination with an energy storage device.

In carrying out the above objects and other objects and features of the present invention, a control system and a method are provided for separately controlling variables such as the mass flow, pressure, temperature, humidification, and utilization of air and fuel, to adjust the voltage of a fuel cell stack. According to the present invention, the fuel cell is directly paralleled to the energy storage device without the need for a power conversion stage. The fuel cell voltage is controlled in such a manner that it is made compatible with voltage characteristics of the energy storage device as a function of load current and the state of charge of the storage device.

The present invention may be useful in low cost, hybrid battery systems, where a fuel cell is partnered with an energy storage device. In such devices, the fuel cell provides long term power and the energy storage device provides peaks of power and/or the ability to store power regenerated from the load.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 4 is a graph of the voltage-current characteristic of a fuel cell using the control system of the present invention;

FIG. 5 is a flow chart of the method of the present invention; and

FIG. 6 is a graph of the voltage-current characteristics of the fuel cell and energy storage device overlaid to illustrate the control method of the present invention.

DETAILED DESCRIPTION OF PREFERRED EMBODIMENTS

Figure 1:
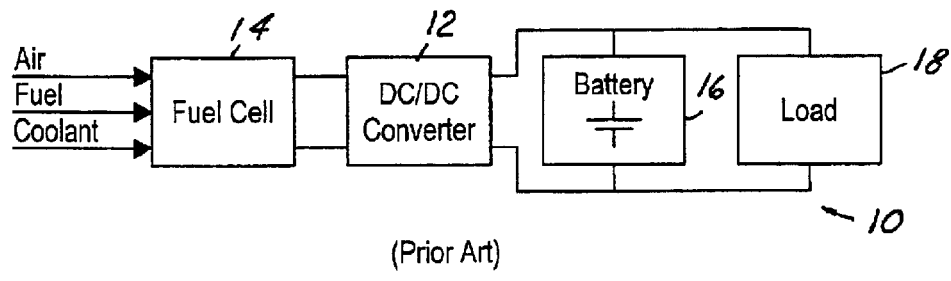
FIG. 1 is a schematic of a prior art fuel cell control system having a power conversion stage between the fuel cell and the energy storage device.

FIG. 1 shows a prior art fuel cell control system 10 having a dc/dc power conversion stage 12. The purpose of the power conversion stage 12 is to interface the fuel cell 14 with an energy storage device 16, such as a battery (shown) or an ultracapacitor (not shown) and a load 18. It Is also possible to use the power conversion stage 12 to interface the fuel cell 14 directly to the load 18.

The present invention provides a system and method for controlling a fuel cell, the outputs of an energy storage device, and the state-of-charge (SOC) of the energy storage device to supply a demanded load.

Figure 2:
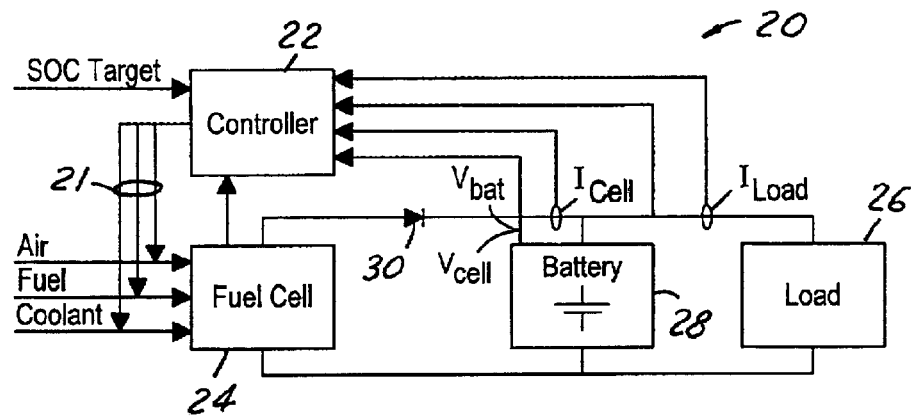
FIG. 2 is a schematic of the fuel cell control system of the present invention.

FIG. 2 is a block diagram of the fuel cell control system 20 of the present invention. A controller 22 controls predetermined variables 21 to adjust a voltage of a fuel cell 24. The variables include, but are not limited to, the mass flow rate of air (Ma) and fuel (Mf), the pressure of the air (Pa) and fuel (Pf), the temperature (Tc) of the fuel cell 24, the humidity of the air and hydrogen, and the current (Ifc) drawn in the fuel cell 24. The predetermined variables are manipulated in response to total power of a load 26 on the combination of the fuel cell 24 and an energy storage device 28, such as a battery as shown in FIG. 2.

An optional dc/dc converter (not shown in FIG. 2) may be used to take a dc voltage from the energy storage device 28 and convert it to a dc voltage that is required to run an inverter (not shown) or directly couple to the load 26. The dc/dc converter may convert the dc voltage to a higher or a lower voltage. According to the present invention, the converter is optional. The prior art example shown in FIG. 1 requires a power converter between the fuel cell and energy storage device.

In the present invention, and referring to FIG. 2, the fuel cell 24 is controlled to act as a charger for the energy storage device 28, shown as a battery in FIG. 2, but could also be an ultracapacitor or other device. The fuel cell 24 is directly paralleled to the energy storage device 28. According to the present invention, there is no need for the intermediate power conversion stage as in the prior art example shown in FIG. 1.

Referring again to FIG. 2, a diode 30 may be used to block current from flowing from the energy storage device 28 into the fuel cell 24. Such reverse current may cause damage to some types of fuel cells. The diode 30 is optional and may be absent.

The fuel cell 24 has a voltage ($V_{cell}$) that is controlled according to the present invention so that it is compatible with a voltage ($V_{bat}$) at the energy storage device 28. The fuel cell voltage ($V_{cell}$) and the energy storage device voltage ($V_{bat}$) are made compatible as a function of load current ($I_{load}$) and the SOC of the energy storage device 28. The load current $I_{load}$ is measured by the controller 22 at the load 26 and is used to determine a demand current for the fuel cell 24.

The fuel cell voltage $V_{cell}$ is a non-linear function having several controllable parameters. These include, but are not limited to;

$M_f$=the mass flow rate of fuel
$M_a$=the mass flow rate of air
$P_f$=the pressure of the fuel
$P_a$=the pressure of the air
$RH_a$=the humidity of the air
$T_c$=the temperature of the fuel cell
$I_{fc}$=the current drawn in the fuel cell The voltage of the energy storage device, $V_{bat}$ is also a function of several parameters, including but not limited to;

SOC=state of charge of the energy storage device
$I_b$=the current into or out of the energy storage device
$T_b$=the temperature of the energy storage device
$A_b$=the age of the energy storage device Through modeling, measurement and control of a subset of all of the controllable parameters in the fuel cell voltage and the parameters in the energy storage device, the voltage-current characteristics of both of these devices are coordinated to achieve control of the SOC of the energy storage device. By controlling the SOC, the life of the energy storage device is extended and an adequate reserve energy margin is maintained. The reserve energy makes it possible to handle temporary high-load current conditions that are due to fluctuations in the external load 26.

The cell voltage is given by:

$$V_{cell} = V_{Th} - (RT/2F)ln(PH_2O/PH_2)*(1/(PO_2)^{1/2}) \quad (1)$$

where $V_{cell}$ is the cell voltage and $V_{Th}$ is the theoretical Nernst voltage. The Nernst voltage is a theoretically calculated voltage that represents the maximum cell voltage that can be obtained, assuming there are no losses. ($PH_2O/PH_2$) is the partial pressure of water and Hydrogen gas in the fuel, $PO_2$ is the partial pressure of oxygen gas in the oxidant, R is the gas constant and T is the cell temperature.

An average cell voltage can be calculated by monitoring the cell conditions and applying equation (2) as follows:

$$V_{cell} = [(1-\alpha)i\ V_{in} + \alpha V_{out} - IR_{eff} + RT/2F ln(1-(I_{cell})/I_{limit}))] \quad (2)$$

where $V_{in}$, and $V_{out}$ are the Nernst voltages for inlet and outlet conditions, $\alpha$ is the weighting factor for the cell voltage, $R_{eff}$ is the effective cell resistance at temperature, T, $I_{cell}$ is the cell current and $I_{limit}$ is the limiting current. The limiting current is dependent upon the cell behavior and each cell will have its own limiting current depending on the system.

The effective cell resistance, $R_{eff}$ is given by:

$$R_{eff} = R_o e^{[(\sigma_t \cdot T_o)/R_o][ln(T_o/T_{cell})]} \quad (3)$$

where $R_o$ is the effective cell resistance at a reference temperature $T_o$, $\sigma_t$ is the temperature coefficient, and $T_{cell}$ is the average cell temperature.

Figure 3:
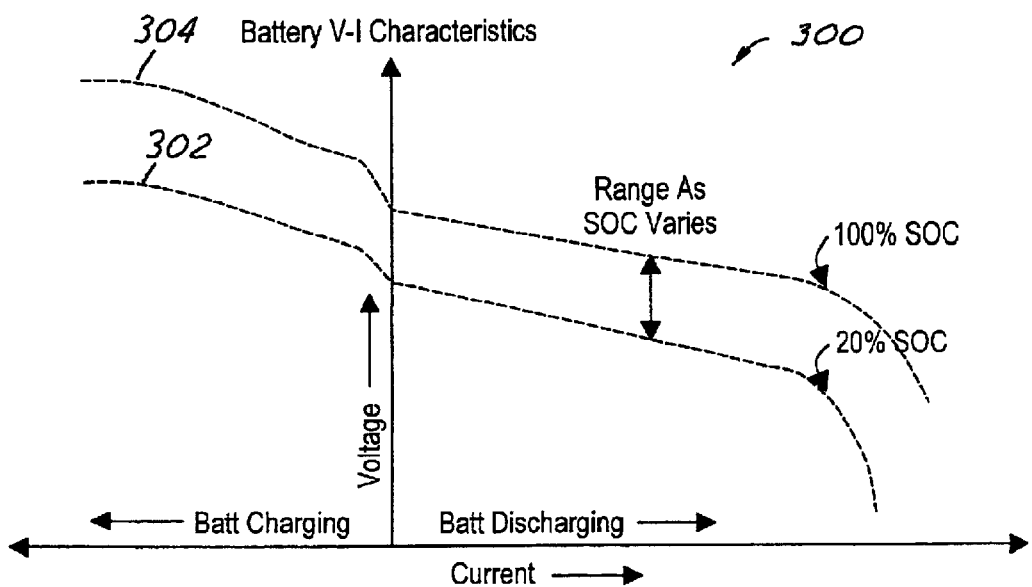
FIG. 3 is a graph of the voltage-current characteristics of an energy storage device.

FIG. 3 is a graph of a voltage-current characteristic 300 for the energy storage device and FIG. 4 is a graph of a voltage-current characteristic 400 for the fuel cell. The voltage-current characteristic 300 of the energy storage device is a non-linear function of the current. The characteristic 302 represents the battery having a low SOC and the characteristic 304 represents the battery having a high SOC.

Referring now to FIG. 4, the fuel cell characteristic 400 is shown as a fuel cell curve 402 for a low SOC and a fuel cell curve 404 for a high SOC. The controller manipulates the fuel cell curves 402, 404 as the load current ($I_{load}$) varies, thereby controlling the SOC of the energy storage device. The operating point for a given load current occurs at the intersection of the curves and is shown later herein with reference to FIG. 6 following the description of the method of the present invention.

The method 100 of the present invention is described in conjunction with FIG. 5. The present invention determines 102 the desired change in the energy storage device's state of charge. This is accomplished by way of a comparison of a current SOC with the SOC target, shown in FIG. 2 at 32. The load current $I_{load}$ is measured 104 by way of the controller.

The method then determines 106 the desired amount of load current that is provided by the fuel cell so that the SOC of the energy storage device is increased or decreased as desired. Through dynamic system modeling of the fuel cell voltage equations, as described above, predetermined parameters are manipulated 108 according to the measured value of the load current $I_{load}$. The fuel cell voltage $V_{cell}$ is controlled 106 as a function of the load current $I_{load}$. Thereafter, the energy storage device SOC is controlled 108 as a function of the fuel cell voltage $V_{cell}$.

FIG. 6 illustrates an example 600 of the operation of the system and method of the present invention. FIG. 6 is a graph of the voltage-current characteristics 602, 604 for the energy storage device with respect to axis 606. The fuel cell voltage-current characteristics 608, 610 are shown with respect to axis 612. The axis 606 and the axis 612 are offset with respect to each other by the load current 614. As the load current varies, the distance between the two axes 606 and 612 will vary in direct proportion.

At a given load current, the SOC of the energy storage device is controlled as follows. Assume the starting SOC for the energy storage device is represented by the voltage-current characteristic 602, which shows the characteristic of the energy storage device 20% SOC. When the fuel cell is controlled such that its voltage-current characteristic is described by the curve 608, the intersection of the curves 602 and 608 will determine an operating point 616. The load current will be apportioned into an energy storage device current 618 and a fuel cell current 620.

For instances where the SOC is to be increased for the given level of load current, the predetermined control parameters of the fuel cell are adjusted, according to the fuel cell voltage equations described herein as well as any linear or non-linear system models that may be necessary. The fuel cell voltage current characteristic curve becomes as shown at 610.

Immediately after the control is adjusted as described above, the energy storage device characteristic 602 and the fuel cell characteristic 610 intersect to reach a new operating point that is now shown at 622. At the operating point 622, the energy storage device is being charged and the load current is still being served. As the energy storage device SOC increases to 100%, the voltage-current characteristic will change until the time where 100% SOC is reached. At this point, the energy storage device voltage-current characteristic 604 applies, and a final operating point of 624 is defined. At the final operating point 624, the energy storage device has zero current and the load current is supplied entirely by the fuel cell.

By modifying the predetermined control parameters, control over a full range of the state of charge can be achieved. A desired division of load current between the fuel cell and the energy storage device can also be achieved.

The invention covers all alternatives, modifications, and equivalents as may be included within the spirit and scope of the appended claims.

What is claimed is:

1. A system for controlling an output of a fuel cell, said system comprising:
    a fuel cell having an output voltage;
    an energy storage device directly paralleled to said fuel cell;
    a controller in communication with said fuel cell, said controller for controlling an output voltage of said fuel cell and an output voltage of said energy storage device, said controller having logic for controlling said fuel cell voltage as a function of predetermined parameters and said energy storage device state of charge as a function of said predetermined parameters; and
    wherein said controller models, measures and controls a subset of said predetermined parameters for said fuel cell and said predetermined parameters of said energy storage device to control a state-of-charge of said energy storage device.

2. The system as claimed in claim 1 wherein said predetermined parameters for said fuel cell voltage further comprise at least one of a mass flow rate of fuel, a mass flow rate of air, a pressure of fuel, a pressure of air, a humidity of air, a humidity of hydrogen, a temperature of said fuel cell and a current drawn from said fuel cell; and
    said predetermined parameters for said energy storage device voltage further comprise at least one of a state-of-charge for said energy storage device, a current of said energy storage device and an age of said energy storage device.

3. The system as claimed in claim 1 wherein said controller uses a load current to determine a demand load.

4. The system as claimed in claim 3 wherein said controller further comprises logic to modify a fuel cell voltage for dividing said load current into a first portion related to said energy storage device and a second portion related to said fuel cell.

5. The system as claimed in claim 1 wherein said energy storage device is a battery.

6. The system as claimed in claim 1 wherein said energy storage device is an ultracapacitor.

7. A method for controlling an output of a fuel cell system having, a controller, a fuel cell in communication with the controller, an energy storage device directly paralleled to the fuel cell, and an external load, said method comprising the steps of:
    determining a desired state of charge for said energy storage device;
    measuring a load current;
    modeling predetermined parameters of the fuel cell and the energy storage device based on said desired state of charge;
    controlling a state-of-charge for the energy storage device based on said predetermined parameter models; and
    coordinating voltage-current characteristics for the energy storage device with voltage-current characteristics for the fuel cell.

8. The method as claimed in claim 7 wherein said step of modeling predetermined parameters further comprises:
    modeling at least one of a mass flow rate of air, a mass flow rate of fuel, a pressure of air, a pressure of fuel, a temperature of said fuel cell, a humidity of air, a humidity of hydrogen, arid a fuel cell current for the fuel cell; and
    modeling at least one of a state of charge, a current, a temperature and an age of the energy storage device.

9. The method as claimed in claim 7 wherein said step of coordinating voltage-current characteristics for the energy storage device and the fuel cell further comprises the steps of:
    determining a first operating point for a detected state of charge defined by the intersection of the voltage-current characteristic for the fuel cell and the voltage-current characteristic of the energy storage device;
    determining a final operating point for a desired state of charge; and
    modifying the predetermined parameters to adjust the detected state of charge to the desired state of charge.

10. The method as claimed in claim 9 further comprising the step of dividing said load current to define a first portion relative to said fuel cell and a second portion relative to said energy storage device, wherein the load current is being served by both the energy storage device and the fuel cell and wherein at a 100% state of charge for said energy storage device, the load current is supplied entirely by the fuel cell.

11. A method of controlling the state of charge for an energy storage device in a system having a fuel cell in communication with a controller and directly paralleled to an energy storage device and an external load, said method comprising the steps of:
    determining a current state of charge for the energy storage device;
    determining a desired state of charge for the energy storage device;
    modeling a subset of predetermined parameters of the fuel cell and the energy storage device based on the measured value of a load current;
    controlling a voltage of the fuel cell based on the predetermined parameter models; and
    coordinating a voltage-current characteristic of the storage device with a voltage-current characteristic of the fuel cell to adjust the current state of charge to the desired state of charge for the energy storage device.

12. The method as claimed in claim 11 wherein said step of modeling predetermined parameters of the fuel cell further comprises modeling at least one of a mass flow rate of air, a mass flow rate of fuel, a pressure of air, a pressure of fuel, a temperature of said fuel cell, a humidity of air, a humidity of hydrogen, and a fuel cell current; and
    said step of modeling predetermined parameters of the energy storage device further comprises modeling at least one of a state of charge, a current, a temperature and an age.

13. The method as claimed in claim 12 further comprising the step of dividing the load current between the fuel cell and the energy storage device based on the state of charge for the energy storage device.

14. The method as claimed in claim 13 wherein said step of dividing the load current further comprises, at 100% state of charge, the load current is supplied entirely by the fuel cell.

* * * * *